2,917,405
Patented Dec. 15, 1959

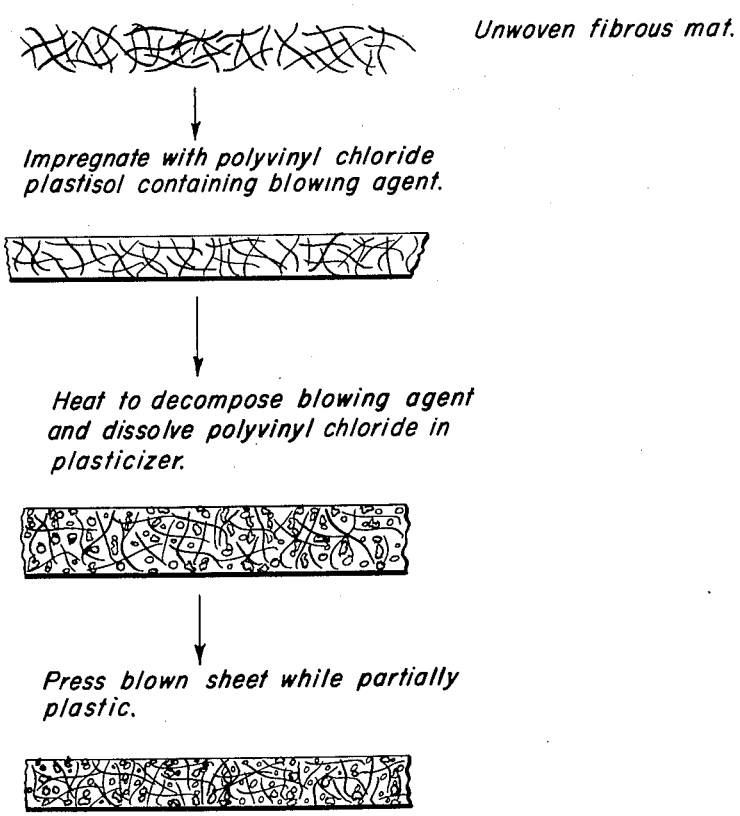

2,917,405

NON-WOVEN FABRIC IMPREGNATED WITH A FOAMED PLASTIC

Norman Grant Gaylord, Westbury, N.Y., assignor to E. I. du Pont de Nemours and Company, Wilmington, Del., a corporation of Delaware Application August 28, 1956, Serial No. 606,549

6 Claims. (Cl. 117—65)

This invention relates to a polymeric sheet material and more particularly to an unwoven fibrous mat embedded in a sheet of plasticized polyvinyl chloride having a cellular structure.

The importance of polymeric sheet materials, especially for such applications as upholstery and leather replacements is well known. Many such materials are useful because they are strong, wear resistant, easily dyed and flexible at low temperatures. However, these sheet materials of the prior art have lacked the desirable combination of comfort in hot and cold weather, vapor permeability or "breathability," and the "hand" or feel of natural and woven materials. For example, polyvinyl chloride coverings of the kind commonly used heretofore on automobile seats and furniture feel uncomfortably hot in the summer and cold in the winter. Furthermore, such coverings are ordinarily impervious and do not have the desirable texture and hand of leather, fabrics and the like. I have discovered a material which retains the desirable properties of polymeric sheets of the prior art, yet is flexible, comfortable and pleasing to feel.

The product of this invention is an unwoven fibrous met embedded in a sheet of plasticized polyvinyl chloride having a cellular structure. The sponge-like cellular structure of plasticized polyvinyl chloride preferably constitutes approximately 50 to 90% of the total weight of the sheet and contains a myriad of small voids formed by the decomposition of a blowing agent incorporated in the resin.

The general method of producing this material comprises impregnating a fibrous mat with a plasticized polyvinyl chloride resin containing a blowing agent, heating the mat to blow the resin, and compressing the resulting sheet while it is still partially plastic.

In the first step an unwoven mat of fibers is impregnated with approximately from 1 to 9 times its weight of plasticized polyvinyl chloride, which, in the preferred embodiment, is in the form of a plastisol. Plastisol as defined here refers to undissolved vinyl chloride polymer in powder form dispersed in a liquid plasticizer. For every 100 parts by weight of polyvinyl chloride the plastisol includes approximately from 20 to 200 and preferably from 60 to 150, parts by weight of plasticizer and approximately from 3 to 25 parts by weight of blowing agent. Often small amounts of thermal stabilizer and pigment are added to the plastisol.

The choice of plasticizer and blowing agent is not critical. Di(2-ethyl hexyl)phthalate, dioctyl phthalate, tricresyl phosphate, di(butoxyethyl)phthalate, dibutyl phthalate, methoxyethyl acetyl ricinoleate, sebacic acid esters such as dibutyl sebacate and di(butoxyethyl)sebacate, epoxidized soy-bean oil, di(2-ethyl hexyl) azelate, didecyl adipate, diisooctyl adipate, butyl isodecyl phthalate, isooctyl palmitate, octyl decyl phthalate, didecyl phthalate, isooctyl isodecyl phthalate, dioctyl sebacate, triethylene-glycol dipelargonate and combinations thereof are, among others, suitable plasticizers.

Examples of blowing agents are N,N'-dimethyl-N,N'-dinitroso terephthalamide, N,N'-dinitroso urethans such as those disclosed in U.S. Patent 2,683,696, benzilmonohydrazons such as those described in U.S. Patent 2,586,-887, α,α'azobisisobutyronitrile, diazoaminobenzene, 1,3-bis(o-xenyl)triazene, 1,3-bis(p-xenyl)triazene, sodium bicarbonate and oleic acid, ammonium carbonates, and mixtures of ammonium chloride and sodium nitrite. Compounds which act as thermal stabilizers include, for example, barium and cadmium salts of long chain fatty acids such as lauric, capric, caprylic, oleic, myristic, palmitic and stearic acids, tetrasodium phosphate, tribarium orthophosphate, alkali metal monosulfides, oxides of lead barium and cadimium, perborates of group II metals, alkaline earth ricinoleates, and antimony, zinc, sodium and cadmium arsenates and arsenites.

The unwoven fibrous mat is preferably condensed to a limited extent prior to impregnation to facilitate handling and increase the strength of the final product. This may be done by methods known to the art such as passing the mat between heated pressure rolls, pressing between heated platens or by needle looming. The mat fibers may be selected from any of a wide group of fibrous materials, both natural and synthetic, including, for example, nylon fibers such as those shown in U.S. Patents 2,071,253 and 2,130,948, polyethylene terephthalate fibers as described in U.S. Patent 2,465,319, acrylonitrile fibers as disclosed in U.S. Patent 2,719,140, viscose and acetate rayon fibers, regenerated cellulose fibers, and cotton and wool. Fibers 0.1 to 8 inches long with deniers ranging from 0.05 to 16 can be used; however, fiber lengths of from 0.5 to 4 inches and deniers of 5 or less are preferred.

To impregnate the mat, it is laid on a film of plastisol and pressed, thereby forcing the film of plastisol into the mat. Alternatively, a layer of plastisol can be applied to both sides of the mat and pressed into the mat. The particular pressure for this operation is not critical and will vary with the thickness of the mat, the fiber denier, etc. The primary object is to thoroughly impregnate the mat. Although the plastisol method of impregnation is preferred, other methods of distributing the plasticized polyvinyl chloride throughout the mat can be used; for example, the mat can be sprayed with or dipped into a solution of the plasticized resin.

After the mat is thoroughly impregnated, it is heated to decompose the blowing agent and, in the preferred embodiment, to dissolve the polyvinyl chloride in the plasticizer, thus forming a continuous cellular structure which adheres to the fibers. This heating can be done by either of two methods. One method consists of heating the sheet directly to the temperature necessary to decompose the blowing agent and dissolve the polyvinyl chloride in the plasticizer, and holding the sheet at that temperature until the continuous cellular structure is formed. Although the necessary time and temperature vary with the plasticizer and blowing agent used, the process usually requires holding the sheet at from 300° to 450° F. and preferably from approximately 340° to 400° F. for about 5 to 60 minutes.

Alternatively, the sheet is heated to a temperature sufficient to decompose the blowing agent but insufficient to dissolve the polyvinyl chloride in the plasticizer, then, after the blowing agent has completely decomposed and foamed the plastisol, the sheet is raised to the temperature necessary to form a continuous, cellular, resin phase. Like the one-step method, the time and temperature needed for this process vary with the materials used; typically, to decompose the blowing agent, the sheet must be heated to approximately 150 to 250° F. for about 5 to 30 minutes and, to form the continuous, cellular, resin phase, it must be heated for about 20 to 50 minutes at approximately 300 to 400° F.

The mat impregnated with plasticized polyvinyl chloride is usually heated under a pressure of less than 300 pounds per square inch; however, it can also be heated without pressure. Heating the sheet under pressure between the hot platens of a press facilitates even heat transfer, but gives a thinner and more compact structure. Of course, if the surface is to be embossed during this operation, the sheet must be pressed against the embossing plate.

After the sheet has been heated, with or without pressing, to give a continuous, cellular, polyvinyl chloride phase, the sheet is cooled and, while the plasticized polyvinyl chloride is still somewhat plastic, it is pressed. Useful products can be obtained without compressing the blown sheet; however, for most applications this final step is preferred. This pressing, particularly when the previous heating step is done without pressure, permits a final control of the texture, thickness and porosity of the sheet; the more the product is pressed, the thinner and less porous it becomes. The porosity of the products measured by its water vapor permeability value as defined in Example I should be at least 850, and preferably, between 1000 and 15,000 grams per hour per 100 square meters. If one of the pressing faces is a suitably etched plate, the surface of the sheet can also be embossed during this final step.

The product of this invention does not crack at low temperatures and is tough, wear resistant and flexible; in addition, it is breathable and has a pleasing feel. These characteristics make the product very suitable for such applications as a rug material, as a surface covering and as a leather replacement. It is particularly suitable for an upholstery material because of its feel and its comfort in hot and cold weather.

The following examples are intended to illustrate the invention and are not intended to limit it in any way.

Example I

A polyvinyl chloride plastisol was prepared by mixing the following constituents simultaneously on a water-cooled three-roll paint mill.

|  | Parts by weight |
|---|---|
| Polyvinyl chloride—"Geon" 121 (B. F. Goodrich Chemical Co.) | 100 |
| Plasticizer: | |
|    Epoxidized soy-bean oil "Paraplex" G-62 (Rohm & Haas) | 50 |
|    Di(2-ethyl hexyl)phthalate | 50 |
| Blowing agent: | |
|    Oil-soluble petroleum sulfonate | 3 |
|    N,N' - dimethyl - N,N' - dinitrosoterephthalamide | 10 |
| Pigment | 10 |
| Ground wood cellulose filler | 10 |

A 22 mil film of this plastisol was spread on a sheet of polytetrafluoroethylene-coated glass fabric which covered a steel supporting plate. A condensed mat weighing approximately 4 ounces per square yard was prepared by passing a loose batt of 3-denier, 1½ inch polyethylene terephthalate fibers through a standard needle loom 3 or 4 times. A 15 inch square section of this mat, a second sheet of polytetrafluoroethylene/glass fabric and a second steel plate were placed successively on top of the film to complete the lay-up. The lay-up was next cold-pressed for 2 minutes at a pressure of 200 p.s.i.g., then transferred to a second press and hot-pressed for 10 minutes at 350° F. and 100 p.s.i.g. pressure. Finally, heating was discontinued and the blown sheet was immediately given a second cold pressing for 3 to 4 minutes at 100 p.s.i.g. pressure. The resulting product had the following properties:

| | |
|---|---|
| Weight, oz./sq. yd. | 11 |
| Thickness, mils | 47 |
| Tensile strength, p.s.i. | 837 |
| Ultimate percent elongation | 66 |
| Percent fiber | 36 |
| Percent blown plasticized polyvinyl chloride | 64 |
| Cold crack temperature ° F | <−60 |
| Water vapor permeability value, gr./hr./100 sq. m. | 2040 |

The cold crack temperature is the temperature at which a piece of sheet which is folded on itself begins to crack at the fold. The water vapor permeability value is a measure of the porosity of the material and is determined by the test described by Kanogy and Vickers in the Journal of American Leather Chemists Association, 45, pp. 211–242 (April 19, 1950), and referred to as leather permeability value or LPV. Briefly the test is performed by filling a 3-inch diameter crystallizing dish with 12-mesh calcium chloride and covering the dish with a membrane of the substance under test. The dish is then inverted and suspended in an atmosphere at 90% relative humidity and 23° C. The increase in weight of the calcium chloride is a measure of the moisture vapor-permeability of the sheet under test.

Example II

A 15-inch square, needle-loomed mat weighing 7 ounces per square yard and composed of 3-denier, 1½ inch polyethylene terephthalate fibers was impregnated under a pressure of 300 p.s.i.g. with the plastisol and by the procedure used in Example I. A thin, 4-mil film of plastisol which did not contain a blowing agent was spread on an embossing plate coated with a silicone mold-release agent. Next, the mat was laid on the 4-mil film and pressed for 10 minutes at 350° F. and 200 p.s.i.g. pressure to blow the impregnated mat. Finally, the blown material was cold-pressed for 3–4 minutes under a pressure of 100 p.s.i.g. The resulting coated and embossed sheet had the following properties:

| | |
|---|---|
| Weight, oz./sq. yd. | 31 |
| Thickness, mils | 62 |
| Tensile strength, p.s.i. | 1636 |
| Ultimate percent elongation | 58 |
| Weight percent fiber | 10 |
| Weight percent plasticized polyvinyl chloride | 90 |
| Cold crack temperature ° F | 20 |
| Water vapor permeability value, gr./hr./100 sq. m. | 850 |

The product of this example was a strong, breathable sheet suitable for a surface covering or leather replacement.

Example III

A plastisol composed of the following materials was prepared on a three-roll paint mill.

| | Parts by weight |
|---|---|
| Polyvinyl chloride—"Geon" 121 (B. F. Goodrich Chemical Co.) | 100 |
| Plasticizer: | |
|    Epoxidized soy-bean oil "Paraplex" G-62 (Rohm & Haas) | 43.2 |
|    Di(2-ethyl hexyl) phthalate | 40.5 |
|    Mixed isomeric terphenyls | 6.3 |
| Blowing agent: | |
|    Oil-soluble petroleum sulfonate | 6.0 |
|    N,N' - dimethyl - N,N' - dinitrosoterephthalamide | 10.0 |
| Thermal stabilizer: Coprecipitated mixture of barium and cadmium salts of coconut oil acids, predominately lauric acid | 2.0 |
| Pigment | 10.0 |

A needle-loomed mat weighing 6 ounces per square yard and composed of 3-denier, 1½-inch, crimped viscose rayon was impregnated with the plastisol described above by pressing the mat-plastisol lay-up under a pressure of 250 p.s.i.g. for about 5 minutes. The impregnated mat was then blown and pressed as described in Example I. The resulting product had the following properties.

| | |
|---|---|
| Weight, oz./sq. yd | 20.9 |
| Thickness, mils | 58 |
| Tensile strength, p.s.i. | 575 |
| Ultimate percent elongation | 35 |
| Water vapor permeability value, gr./hr./100 sq. m | 12,200 |

This product was particularly suitable as a breathable upholstery material.

*Example IV*

A 7-inch square, needle-loomed nylon mat weighing 3 ounces per square yard and composed of 3-denier, 1½ inch fibers was impregnated by the procedure described in Example I with a plastisol having the following composition:

| | Parts by weight |
|---|---|
| Polyvinyl chloride—"Geon" 121 (B. F. Goodrich Chemical Co.) | 45.4 |
| Plasticizer: | |
| Epoxidized soy-bean oil "Paraplex" G-62 (Rohm & Haas) | 22.7 |
| Di(2-ethyl hexyl)azelate | 10.9 |
| Methyl pentachlorostearate | 11.8 |
| Blowing agents: | |
| Oil-soluble petroleum sulfonate | 3.2 |
| N,N' - dimethyl - N,N' - dinitrosoterephthalamide | 4.5 |
| Thermal stabilizer: Barium-cadmium salts of coconut oil acids | 0.5 |
| Pigment | 1.0 |

The impregnated sheet was heated without pressing for 20 minutes at 350° F., then cooled without further treatment. The final product was 35 mils thick. Although the final product was rougher than those of the other examples, it still had the excellent body and breathability characteristics of the materials of this invention.

*Example V*

A 6-inch square, 16½-ounce per square yard, needle-loomed mat of 3-denier non-heat shrinkable nylon tow was impregnated with the plastisol and by the general procedure shown in Example III. Next, a 50-mil film of the same plastisol was spread on an embossing plate coated with a silicone release agent. The impregnated mat was turned over so that the side which rested on the first film of plastisol now faced upward and the impregnation procedure was repeated. For 30 to 35 minutes, the assembly was hot pressed at 350° F. At the start of the heating step the platens of the press were adjusted so that they just touched the mat but exerted no pressure; hence the heating step was carried out at essentially atmospheric pressure. The final product was about 160 mils thick and had a water vapor permeability value of about 5700 grams per hour per 100 square meters.

The embodiments of the invention in which an exclusive property or privilege is claimed are defined as follows.

I claim:

1. A polymeric sheet comprising an unwoven fibrous mat embedded in and bound by a binder consisting of a cellular structure of plasticized polyvinyl chloride which fills the spaces between the fibres in said mat, said cellular structure of plasticized polyvinyl chloride constituting approximately from 50 to 90% of the total weight of the sheet and containing approximately 20 to 200 parts by weight of plasticizer for each 100 parts by weight of polyvinyl chloride.

2. A polymeric sheet comprising an unwoven fibrous mat embedded in and bound by approximately from 1 to 9 times its weight of a binder consisting of a cellular structure of plasticized polyvinyl chloride which fills the spaces between the fibres in said mat, said plasticized polyvinyl chloride containing approximately from 60 to 150 parts by weight of plasticizer for each 100 parts by weight of polyvinyl chloride.

3. A polymeric sheet having a water vapor permeability value of at least 1000 grams per hour per 100 square meters and comprising an unwoven fibrous mat embedded in and bound by approximately from 1 to 9 times its weight of a binder consisting of a cellular structure of plasticized polyvinyl chloride which fills the spaces between the fibres in said mat, said plasticized polyvinyl chloride containing approximately from 60 to 150 parts by weight of plasticizer for each 100 parts by weight of polyvinyl chloride.

4. A process which comprises impregnating an unbound and unwoven fibrous mat with about 1 to 9 times its weight of plasticized polyvinyl chloride which contains a blowing agent, said plasticized polyvinyl chloride containing approximately from 20 to 200 parts by weight of plasticizer and approximately from 3 to 25 parts by weight of said blowing agent for each 100 parts by weight of polyvinyl chloride, heating the resulting sheet to decompose said blowing agent, and compressing the sheet while the plasticized polyvinyl chloride is still partially plastic.

5. A process which comprises impregnating an unbound and unwoven fibrous mat with about 1 to 9 times its weight of polyvinyl chloride plastisol which contains a blowing agent, said plastisol containing approximately from 20 to 200 parts by weight of plasticizer and approximately from 3 to 25 parts by weight of said blowing agent for each 100 parts by weight of polyvinyl chloride, heating the resulting sheet to decompose the blowing agent and to dissolve the polyvinyl chloride in the plasticizer, and compressing said sheet while the plasticized polyvinyl chloride is still partially plastic.

6. A process which comprises impregnating an unwoven fibrous mat with approximately 1 to 9 times its weight of polyvinyl chloride plastisol, said plastisol including approximately from 60 to 150 parts by weight of plasticizer and approximately 3 to 25 parts by weight of blowing agent for each 100 parts by weight of polyvinyl chloride, heating the resulting sheet to decompose said blowing agent and dissolve the polyvinyl chloride in the plasticizer, and compressing said sheet while the plasticized polyvinyl chloride is still partially plastic.

References Cited in the file of this patent

UNITED STATES PATENTS

| | | |
|---|---|---|
| 2,586,887 | Van Gauer | Feb. 26, 1952 |
| 2,715,588 | Graham et al. | Aug. 16, 1955 |
| 2,725,309 | Rodman | Nov. 29, 1955 |
| 2,734,841 | Merriman | Feb. 14, 1956 |
| 2,757,100 | Simril | July 31, 1956 |
| 2,760,884 | Graf | Apr. 28, 1956 |
| 2,802,767 | Mighton | Aug. 13, 1957 |